(12) United States Patent
Codrington

(10) Patent No.: US 8,683,505 B1
(45) Date of Patent: Mar. 25, 2014

(54) MOBILE ENTERTAINMENT MULTIMEDIA AND COMMUNICATIONS SYSTEM AND METHOD

(76) Inventor: Damion Daniel Codrington, Miami, FL (US)

(*) Notice: Subject to any disclaimer, the term of this patent is extended or adjusted under 35 U.S.C. 154(b) by 0 days.

(21) Appl. No.: 13/544,738

(22) Filed: Jul. 9, 2012

Related U.S. Application Data

(60) Provisional application No. 61/505,381, filed on Jul. 7, 2011.

(51) Int. Cl.
- *H04N 7/173* (2011.01)
- *H04N 5/445* (2011.01)
- *G06F 3/00* (2006.01)
- *G06F 13/00* (2006.01)

(52) U.S. Cl.
USPC .................... 725/24; 725/37; 725/39; 725/40

(58) Field of Classification Search
None
See application file for complete search history.

(56) References Cited

U.S. PATENT DOCUMENTS

| | | | |
|---|---|---|---|
| 2009/0320077 A1* | 12/2009 | Gazdzinski | 725/62 |
| 2010/0064306 A1* | 3/2010 | Tiongson et al. | 725/24 |
| 2010/0211693 A1* | 8/2010 | Master et al. | 709/238 |
| 2011/0047284 A1* | 2/2011 | White et al. | 709/231 |
| 2012/0174157 A1* | 7/2012 | Stinson et al. | 725/40 |

* cited by examiner

*Primary Examiner* — Justin Shepard
(74) *Attorney, Agent, or Firm* — Alberto Interian III, Esq.

(57) ABSTRACT

An interactive system for viewing music videos on the go that includes at least one processor, at least one display device electronically connected to the at least one processor, at least one communications means electronically connected to the at least one processor, and computer executable instructions readable by the at least one processor, and operative to display at least one music video channel selection function on the display device, display at least one music video on the display device, and display at least one instant messaging function on the display device, wherein the at least one music video channel selection function, the at least one music video, and the at least one instant messaging function are displayed simultaneously.

20 Claims, 5 Drawing Sheets

MOBILE ENTERTAINMENT MULTIMEDIA AND COMMUNICATIONS SYSTEM AND METHOD

PRIORITY DATA

The present application is a non-provisional of U.S. provisional patent application Ser. No. 61/505,381, titled "Mobile Entertainment Multimedia and Communications System," filed on Jul. 7, 2011, by Damion Daniel Codrington, whose priority is claimed and whose disclosure is hereby incorporated by reference as if fully stated herein.

FIELD

The present disclosure relates generally to electronics systems, and more specifically to mobile entertainment multimedia and communications systems.

BACKGROUND

Access to music videos has been steadily declining since the beginning of the $21^{st}$ century. Many television channels that once entirely comprised of music videos, such as MTV, VH1, BET, and the like, have either entirely eliminated music videos from their programming, or have relegated them to the point of obscurity.

Furthermore, the prime audience of music videos, namely, adolescents and young adults, have started to move away from watching television and music videos, and are every increasingly turning to interactive entertainment means, such as social media, the internet, and the like, and thus, what little music videos are being shown on television are not being viewed by a vast majority of adolescents and young adults.

BRIEF SUMMARY OF DISCLOSURE

Accordingly, the various systems and methods described herein result from the realization that music video viewership and accessibility can be increased by providing an interactive system and method for viewing music videos, comprising displaying at least one music video channel selection function on at least one mobile device's display device, and displaying at least one instant messaging function on the display device, wherein both functions are displayed simultaneously.

DETAILED DESCRIPTION OF PREFERRED EMBODIMENTS

System Level Overview

Figure 1A:
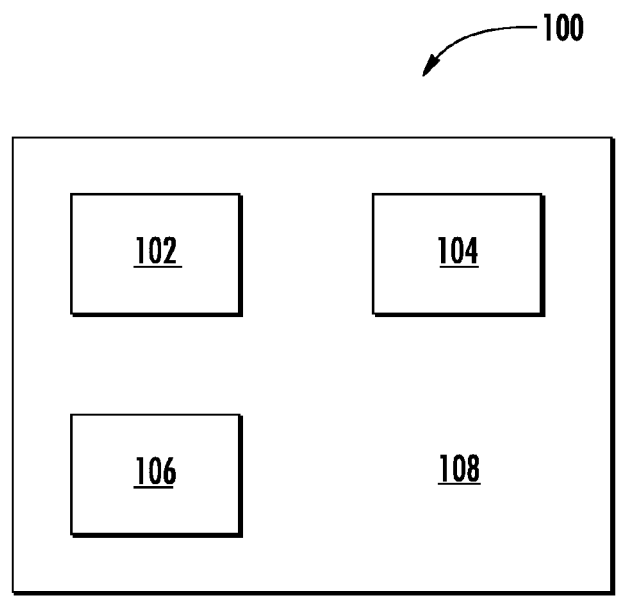
FIG. 1A through 1D show a system in accordance with various embodiments.
Figure 1B:
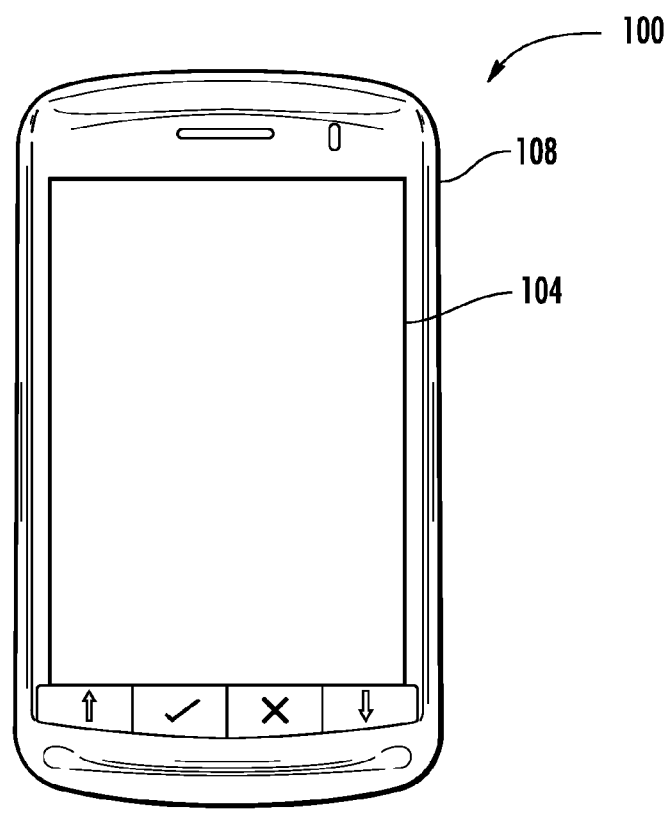
Figure 1C:
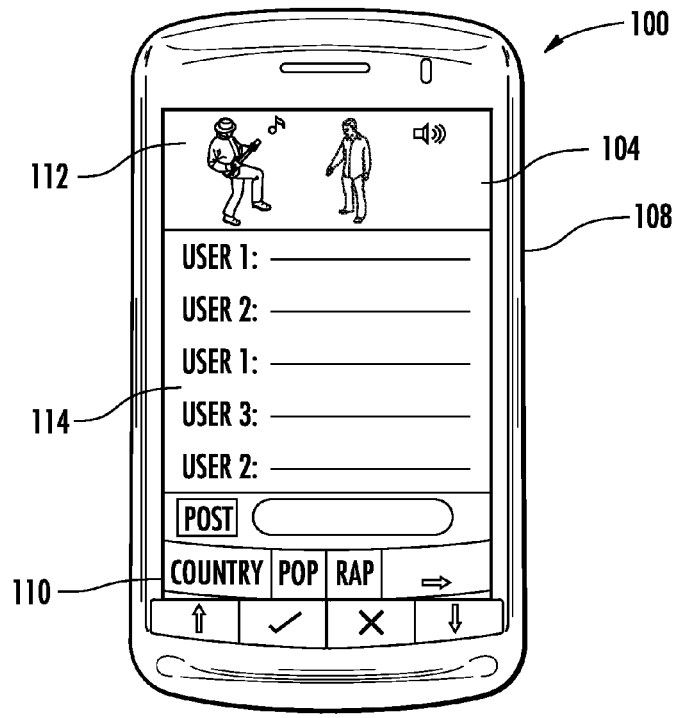
Figure 1D:
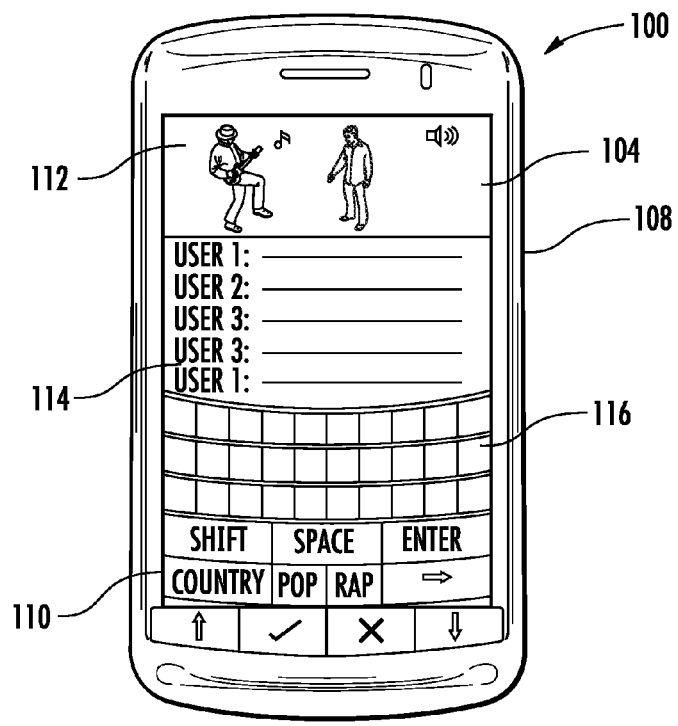

FIGS. 1A through 1D show a system 100, in accordance with various embodiments. System 100 comprises at least one processor 102, at least one display device 104 electronically connected to the at least one processor 102, at least one communications means 106 electronically connected to at least one processor 102, and computer executable instructions (not shown), readable by at least one processor 102 and operative to display at least one music video channel selection function 110 on display device 104, display at least one music video 112 on display device 104, and display at least one instant messaging function 114 on display device 104, wherein the at least one music video channel selection function 110, at least one music video 112, and at least one instant messaging function 114 are displayed simultaneously.

In some embodiments, at least one processor 102 may be any type of processor, including a single or multi core processor. At least one display 104 may be any display device, including, but not limited to, an electronic display device, such as a liquid crystal display, a plasma display, or a light emitting diode display. In some embodiments, at least one display device 104 may comprise a touch-screen. At least one communications means 106 may be any type of communications means, including, but not limited to, a wireless communications means or wired communications means, such as a GSM modem, a WiFi module, a Bluetooth module, a Zigbee module, and any other type of communications means used to communicate directly with another device, or indirectly with another device, such as through a local or wide area network.

In some embodiments, at least one music video channel selection function 110 may present music video channels based on genre, artist, song, and the like. The music video channel selection function may be dynamic or interactive, such as by being scrollable and the like.

In other embodiments, the at least one music video 112 may be any type of music video, including, but not limited to, a live music video, a streamed music video, a pre-recorded music video, and the like. In some embodiments, in place of a music video or when a music video is not being played on the music video channel, a video stream of a Disc Jockey or Video Jockey booth may be displayed.

In a further embodiment, instant messaging function 114 may be any type of instant messaging function, such as a private 1 on 1 instant messaging, a private group instant messaging session (such as a chat room), or a public instant messaging session. In some embodiments, the instant messaging function may be directly tied to the music video channel currently selected, so when a user selects a different music video channel, the instant messaging function also changes to a new channel related to the new music video channel. In alternate embodiments, the instant messaging function may remain constant no matter which music video channel is selected.

In a further embodiment, instant messaging function 114 may comprise a messaging/post feed from at least one social media service, such as, but not limited to, JustSync.com, Facebook.com, Twitter.com, MySpace.com, Orkut.com, Friendster.com, and the like. In yet another embodiment, instant messaging function 114 may comprise a social media service aggregator, wherein messages, posts, and updates from multiple social media service providers may be aggregated and displayed.

In some embodiments, the music video 112 may be positioned at the top of the display device 104, followed by the instant messaging function 114, and the music video channel selection function 110, which may be positioned at the bottom of display device 104. In some embodiments, the layout of the various functions and sections may be set or changed by the user.

In some embodiments, the at least one music video channel selection function 110 may be populated with music video channels that are accessed using at least one communications means 106.

In some embodiments, at least one music video 112 may be pulled or pushed from a server using at least one communications means 106.

In another embodiment, the at least one instant messaging function 114 may be populated with instant messages transmitted or received using communications means 106.

It should be understood that all of the data displayed in the various functions and sections described herein may be pushed or pulled from a server either directly through a computer network, such as the internet. System 100 may connect directly to such a network, or through a network enabled device (such as by being tethered, e.g. Bluetooth tethering).

In another embodiment, the computer executable instructions may be operative to display at least one virtual touchscreen keyboard 116 on display device 104. Keyboard 116 may appear when a user wants to enter text in the instant messaging function 114, and then disappear once the user is done typing. Alternatively, keyboard 116 may be permanently displayed. In yet another embodiment, keyboard 116 may appear or disappear based at a user's discretion. In yet another embodiment, system 100 comprises a physical keyboard electronically connected to at least one processor 102 or other user input device.

In yet another embodiment, system 100 may comprise at least one mobile device 108, which houses at least one processor 102, at least one display device 104, and at least one communications means 106. Mobile device 108 may be a mobile phone, a tablet PC, a mobile PC, a smart phone, or a standalone mobile device, and the like.

In yet another embodiment, at least one communications means 106 comprises a communications means for accessing a data network, such as a local data network, or a wide area data network, such as the internet.

In yet another embodiment, at least one communications means 106 comprises a communications means for accessing a web-enabled device, such as a Bluetooth module for accessing a web-enabled smartphone.

Figure 2A:
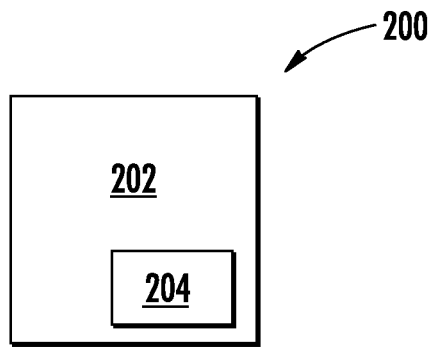
FIGS. 2A and 2B show a system in accordance with various embodiments.
Figure 2B:
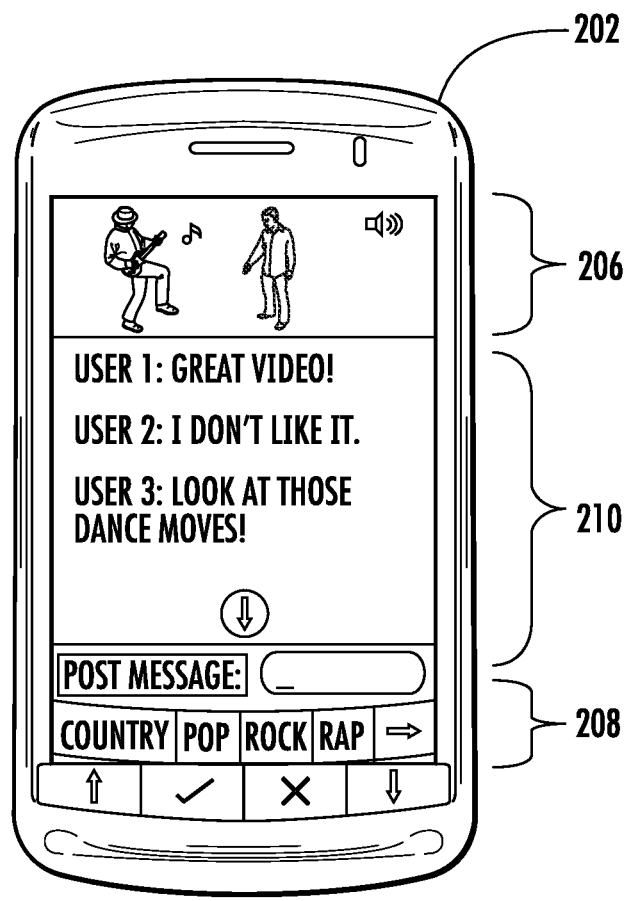

Referring now to FIGS. 2A and 2B, a system 200 is shown in accordance with various embodiments, wherein system 200 comprises a mobile device 202 and computer executable instructions 204 readable by mobile device 202 and operative to display at least one music video 206 on mobile device 202, display at least one music video selection menu 208 on mobile device 202, and display at least one communications feature 210 on mobile device 202, wherein at least two of music video 206, communications feature 210, and music video selection menu 208 are displayed on mobile device 202 simultaneously.

In some embodiments, mobile device 202 may comprise any type of mobile device, including any of the various mobile devices described herein, such as, but not limited to a tablet PC or a smartphone. Mobile device 202 may feature a case, a display device, a user input device, such as a keyboard or touchscreen, a camera, such as a front-facing or rear-facing camera, a battery, memory, a processor(s), a communications module, such as a Wi-Fi module, Bluetooth module, GSM module, CDMA module, a charging and/or communications port, and the like.

Computer executable instructions 204 may comprise any type of computer executable instructions, such as those embodiments disclosed herein, which may include software application or program, such as a mobile application, a downloadable mobile application, a non-downloadable mobile application, computer executable instructions accessible via a mobile application or web browser, and the like.

Music video 206 may comprise any type of genre, such as rock, rap, country, classical, pop, dance, and the like. Music video 206 may comprise a digital music video, wherein said music video may be streamed or downloaded to mobile device 202. Music video 206 may comprise any other embodiment described herein.

In some embodiments, communications feature 210 may comprise a software communications feature, such as, but not limited to, an instant messenger or instant messaging feature, a comment section or feature, or a chat room, such as a virtual chat room. In another embodiment, communications feature 210 may comprise a user input section, such as a text field, and a previous message or comment section, where previous messages or comments posted may be displayed. Communications feature 210 may display communications submitted by other users, such as users of other mobile devices that are watching a music video, and which are connected to the same system. Accordingly, in some embodiments, communications feature 210 may comprise a field for communicating with other viewers of a music video being shown on mobile device 202.

In another embodiment, computer executable instructions 204 may be operative to connect to a central server via a communications network, such as the internet. The central server may be responsible for providing the music videos, as well as for hosting the communications feature. In some embodiments, the central server may be operative to connect to a plurality of mobile devices 202 running computer executable instructions 204. In yet another embodiment, computer executable instructions 204 may be operative to solicit user input in communications feature 210 and transmit the user input to the central server. The central server may then pass on the user input onto other mobile devices that are in the same comment section, watching the same music video, or in the same chat room.

In some embodiments, the various users that are displayed in communications feature 210 may comprise "friends" of a particular user, such as users that are on a particular user's contact list or favorites list. In an alternate embodiment, the various users displayed in the communications feature 210 may comprise users that are watching the same music video.

In another embodiment, the music video selection menu 208 may comprise a menu of music videos, music video genres, artists, songs, and the like, or links thereto. Menu 208 may comprise a scrollable menu.

Method Embodiments

Figure 3:
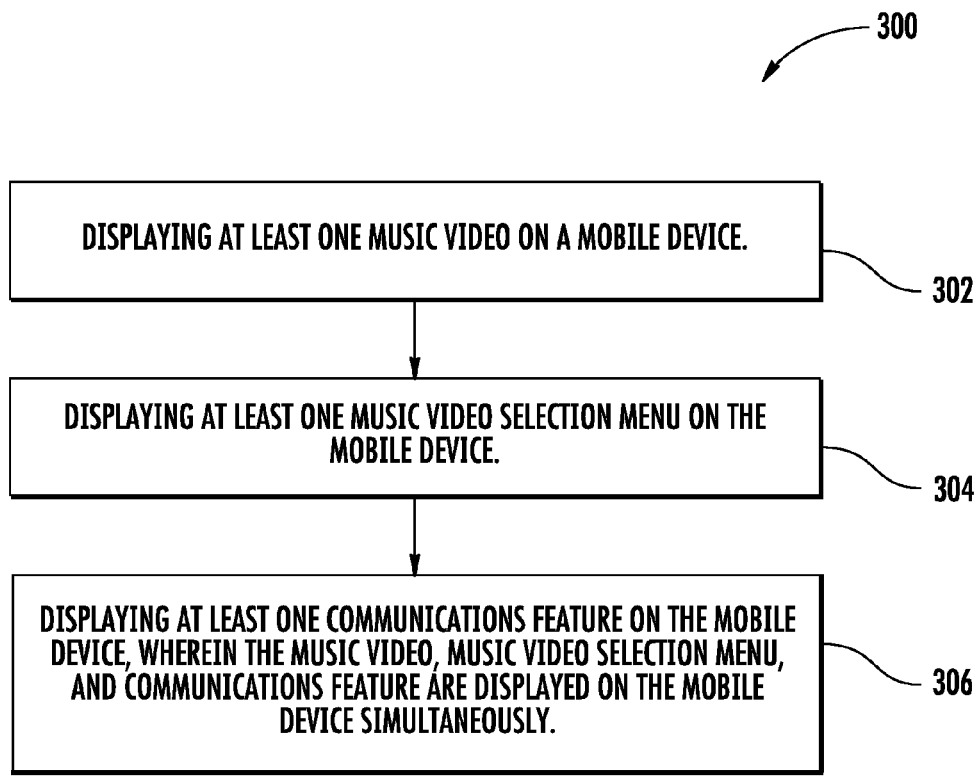
FIG. 3 shows a block diagram depicting a method in accordance with one embodiment.

Referring now to FIG. 3 a block diagram depicting a method 300 is shown in accordance with one embodiment, wherein method 300 comprises using at least one processor to perform any or all of the following: displaying at least one music video on a mobile device (block 302), displaying at least one music video selection menu on the mobile device (block 304), and displaying at least one communications feature on the mobile device, wherein the music video, music video selection menu, and communications feature are displaying on the mobile device simultaneously (block 306).

In some embodiments, using at least one processor may comprise using at least one processor wherein the processor is part of the mobile device. In yet another embodiment, using at least one processor may comprise using at least one processor wherein the processor is part of a server. In some embodiments, the steps of method 300 may be embodied in computer executable instructions stored on a non-transitory computer readable medium, wherein the computer readable medium may be readable by the at least one processor.

In some embodiments, the step of displaying may comprise using at least one display device to display.

In a further embodiment, displaying at least one music video on a mobile device comprises streaming or downloading at least one music video, wherein said music video may be streamed or downloaded to the mobile device. The music video may be streamed or downloaded from a central server or content delivery network.

In another embodiment, displaying at least one music video selection menu comprises displaying at least one music video selection menu comprised of links to music videos that are similar to a video being played on the mobile device. In yet another embodiment, displaying a music video selection menu may comprise displaying a music video selection menu comprised of links to genres, artists, or albums of music videos.

In yet another embodiment, displaying at least one communications feature on the mobile device comprises displaying at least one instant messaging feature, comment feature, or chat feature, wherein said features may be displayed on the mobile device.

In some embodiments, the processor, mobile device, music video, music video selection menu, and communications feature may comprise any of those embodiments described throughout the present disclosure.

Hardware and Operating Environment

This section provides an overview of example hardware and the operating environments in conjunction with which embodiments of the inventive subject matter can be implemented. A software program may be launched from a computer readable medium in a computer-based system to execute the functions defined in the software program. Various programming languages may be employed to create software programs designed to implement the systems and methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Figure 4:
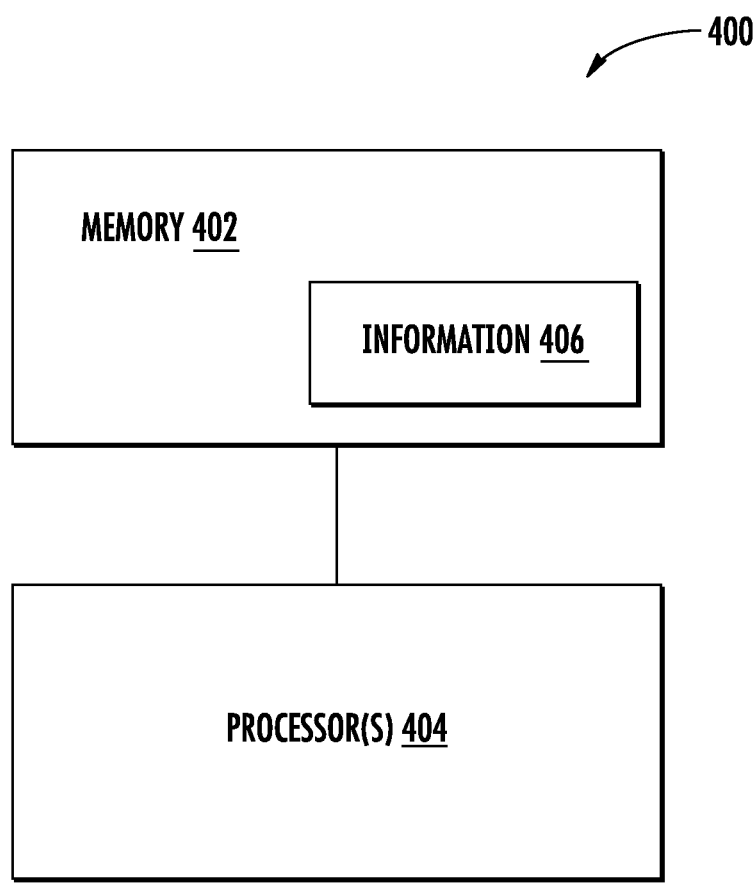
FIG. 4 shows a block diagram representing an apparatus in accordance with one embodiment.

FIG. 4 is a block diagram representing an apparatus 400 according to various embodiments. Such embodiments may comprise a computer, a memory system, a magnetic or optical disk, some other storage device, or any type of electronic device or system. The apparatus 400 may include one or more processor(s) 404 coupled to a machine-accessible medium such as a memory 402 (e.g., a memory including electrical, optical, or electromagnetic elements). The medium may contain associated information 406 (e.g., computer program instructions, data, or both), which, when accessed, results in a machine (e.g., the processor(s) 404) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
  a. at least one processor;
  b. at least one display device electronically connected to the at least one processor;
  c. at least one communications means electronically connected to the at least one processor; and
  d. computer executable instructions readable by the at least one processor, and operative to:
    i. display at least one music video channel selection function on the display device;
    ii. display at least one music video on the display device, or in place of the at least one music video or if the at least one music video is not available, then display a video of a disc or video jockey booth; and
    iii. display at least one instant messaging function on the display device, wherein if a new music video channel is selected then the at least one instant messaging function changes to a new instant messaging function related to the new music video channel; wherein
    iv. the at least one music video channel selection function, the at least one music video, and the at least one instant messaging function are displayed simultaneously.

2. The system of claim 1, wherein the at least one music video channel selection function is populated with music video channels accessed using the at least one communications means.

3. The system of claim 1, wherein the at least one music video is pulled from a server using the at least one communications means.

4. The system of claim 1, wherein the at least one instant messaging function comprises a social media service aggregator, wherein messages, posts or updates from at least one social media services provider are aggregated and displayed.

5. The system of claim 1, wherein the computer executable instructions are further operative to allow a user to set or change a layout of the at least one music video channel selection function, at least one music video, and the at least one instant messaging function on the display device.

6. The system of claim 1, further comprising at least one mobile device, wherein the mobile device houses the at least one processor, the at least one display device, and the at least one communications means.

7. The system of claim 1, wherein the at least one communications means comprises a communications means for accessing a data network.

8. The system of claim 1, wherein the at least one communications means comprises a communications means for accessing a web-enabled device.

9. A system comprising:
  a. a mobile device; and
  b. computer executable instructions readable by the mobile device and operative to:
    i. display at least one music video on the mobile device, or in place of the at least one music video or if the at least one music video is not available, then display a video of a disc or video jockey booth;
    ii. display at least one music video selection menu on the mobile device; and
    iii. display at least one communications feature on the mobile device, wherein if a new music video is selected then the at least one communications feature changes to a new communications feature related to the new music video;

iv. wherein at least two of the music video, communications feature, and music video selection menu are displayed on the mobile device simultaneously.

10. The system of claim 9, wherein the computer executable instructions are configured to allow a user to set or change a layout of the at least one music video selection menu, at least one music video, and the at least one communications feature.

11. The system of claim 9, wherein the computer executable instructions comprise a mobile application.

12. The system of claim 9, wherein the at least one communications feature comprises a social media service aggregator, wherein messages, posts, or updates from at least one social media service provider is aggregated and displayed.

13. The system of claim 9, wherein the at least one music video comprises at least one streamed music video.

14. The system of claim 9, wherein the at least one communications feature comprises an instant messenger, comment section, or chat room.

15. The system of claim 9, wherein the at least one communications feature comprises a field for communicating with other viewers of a music video being shown on the mobile device.

16. The system of claim 9, wherein the computer executable instructions are operative to solicit user input in the communications feature and transmit said user input to a central server.

17. A method comprising:
a. using at least one processor to perform any or all of the following:
    i. displaying at least one music video on a mobile device, or in place of the at least one music video or if the at least one music video is not available, then displaying a video stream of a disc or video jockey booth;
    ii. displaying at least one music video selection menu on the mobile device; and
    iii. displaying at least one communications feature on the mobile device, wherein if a new music video is selected then the at least one communications feature changes to a new communications feature related to the new music video;
    iv. wherein the music video, music video selection menu, and communications feature are displayed on the mobile device simultaneously.

18. The method of claim 17, wherein displaying at least one music video on a mobile device comprises streaming or downloading at least one music video.

19. The method of claim 17, wherein displaying at least one music video selection menu comprises displaying at least one music video selection menu comprised of links to music videos that are similar to a video being played on the mobile device.

20. The method of claim 17, comprising using at least one processor to allow a user to set or change a layout of the at least one music video, the at least one music video selection menu, and the at least one communications feature.

\* \* \* \* \*